(12) United States Patent
Wang et al.

(10) Patent No.: US 11,499,056 B2
(45) Date of Patent: Nov. 15, 2022

(54) DISPLAY SUBSTRATE HAVING WAVELENGTH-ACTUATABLE COLOR FILTER, DISPLAY APPARATUS HAVING THE SAME, AND METHOD OF OPERATING DISPLAY APPARATUS

(71) Applicants: BOE TECHNOLOGY GROUP CO., LTD., Beijing (CN); Beijing BOE Display Technology Co., Ltd., Beijing (CN)

(72) Inventors: Feifei Wang, Beijing (CN); Ping Song, Beijing (CN); Deqiang Liu, Beijing (CN); Hebin Zhao, Beijing (CN); Hongming Zhan, Beijing (CN); Xibin Shao, Beijing (CN)

(73) Assignees: Beijing BOE Technology Development Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 1147 days.

(21) Appl. No.: 16/073,048

(22) PCT Filed: Jan. 9, 2018

(86) PCT No.: PCT/CN2018/071899
§ 371 (c)(1),
(2) Date: Jul. 26, 2018

(87) PCT Pub. No.: WO2019/029124
PCT Pub. Date: Feb. 14, 2019

(65) Prior Publication Data
US 2021/0200022 A1    Jul. 1, 2021

(30) Foreign Application Priority Data
Aug. 10, 2017  (CN) .......................... 201710681594.0

(51) Int. Cl.
*G02F 1/1335* (2006.01)
*C09D 4/06* (2006.01)
(Continued)

(52) U.S. Cl.
CPC ............ *C09D 4/06* (2013.01); *C09K 19/2007* (2013.01); *C09K 19/408* (2013.01);
(Continued)

(58) Field of Classification Search
CPC ......... G02F 1/133514; G02F 1/133512; G02F 1/133516; G02F 1/1343;
(Continued)

(56) References Cited

U.S. PATENT DOCUMENTS 9,505,854 B2    11/2016  Wu et al.
2012/0026150 A1    2/2012  Katayama
(Continued)

FOREIGN PATENT DOCUMENTS

CN    102292670 A    12/2011
CN    104656338 A    5/2015
(Continued)

OTHER PUBLICATIONS

International Search Report & Written Opinion dated May 9, 2018, regarding PCT/CN2018/071899.
(Continued)

*Primary Examiner* — Ruiyun Zhang
(74) *Attorney, Agent, or Firm* — Intellectual Valley Law, P.C.

(57) ABSTRACT

The present application discloses a display substrate. The display substrate includes a base substrate; a color filter on the base substrate and including a plurality of color filter blocks; and an actuator configured to actuate each of the plurality of color filter blocks thereby controlling a wave-
(Continued)

length of light transmitted through each of the plurality of color filter blocks.

19 Claims, 4 Drawing Sheets

(51) Int. Cl.
    *C09K 19/20*     (2006.01)
    *C09K 19/40*     (2006.01)
    C09K 19/04     (2006.01)
    C09K 19/54     (2006.01)

(52) U.S. Cl.
    CPC .......... *G02F 1/133514* (2013.01); *C09K 2019/0448* (2013.01); *C09K 2019/205* (2013.01); *C09K 2019/2078* (2013.01); *C09K 2019/546* (2013.01); *C09K 2323/033* (2020.08); *G02F 1/133512* (2013.01)

(58) Field of Classification Search
    CPC ...... C09K 2019/0448; C09K 2019/205; C09K 2019/2078; C09K 2019/546; C09K 2323/033; C08F 283/124
    USPC ..... 428/1.1, 1.3, 1.32; 349/88, 97, 106, 107, 349/115
    See application file for complete search history.

(56) References Cited

U.S. PATENT DOCUMENTS

| | | |
|---|---|---|
| 2012/0133690 A1 | 5/2012 | Katayama |
| 2016/0377907 A1 | 12/2016 | Wu et al. |
| 2017/0108701 A1 | 4/2017 | Wu et al. |

FOREIGN PATENT DOCUMENTS

| | | |
|---|---|---|
| CN | 104914588 A | 9/2015 |
| EP | 3144723 A1 | 3/2017 |
| JP | 2006011000 A | 1/2006 |
| WO | 2012053364 A1 | 4/2012 |

OTHER PUBLICATIONS

Tunable Mirrorless Lasing in Cholesteric Liquid Crystalline Elastomers, Heino Finkelmann et al., Advanced Materials, 2001, vol. 13, No. 14 (Jul. 18, 2001) pp. 1069-1072.

The Extended European Search Report in the European Patent Application No. 18749280.6, dated Mar. 16, 2021.

DISPLAY SUBSTRATE HAVING WAVELENGTH-ACTUATABLE COLOR FILTER, DISPLAY APPARATUS HAVING THE SAME, AND METHOD OF OPERATING DISPLAY APPARATUS

CROSS-REFERENCE TO RELATED APPLICATION

This application is a national stage application under 35 U.S.C. § 371 of International Application No. PCT/CN2018/071899, filed Jan. 9, 2018, which claims priority to Chinese Patent Application No. 201710681594.0, filed Aug. 10, 2017, the contents of which are incorporated by reference in the entirety.

TECHNICAL FIELD

The present invention relates to display technology, more particularly, to a display substrate, a display apparatus, and a method of operating a display apparatus.

BACKGROUND

Display apparatuses such as liquid crystal display (LCD) apparatuses, organic light-emitting diode display (OLED) apparatuses, and electrophoretic display (EPD) apparatuses have been widely used. Typically, the display apparatus includes an array substrate and a counter substrate assembled together. In some display apparatuses, the counter substrate is a color filter substrate having a color filter. In some display apparatuses, the color filter may be disposed in the array substrate.

SUMMARY

In one aspect, the present invention provides a display substrate, comprising a base substrate; a color filter on the base substrate and comprising a plurality of color filter blocks; and an actuator configured to actuate each of the plurality of color filter blocks thereby controlling a wavelength of light transmitted through each of the plurality of color filter blocks.

Optionally, the plurality of color filter blocks comprise at least a plurality of first color filter blocks and a plurality of second color filter blocks; and the actuator is configured to actuate each of the plurality of first color filter blocks so that light of a first color transmitted through each of the plurality of first color filter blocks, and actuate each of the plurality of second color filter blocks so that light of a second color transmitted through each of the plurality of second color filter blocks, the first color being different from the second color.

Optionally, the actuator is configured to control a thickness of each of the plurality of color filter blocks thereby controlling the wavelength of light transmitted through the plurality of color filter blocks.

Optionally, each of the plurality of color filter blocks comprises a liquid crystal elastomer.

Optionally, each of the plurality of color filter blocks comprises a co-polymer of a liquid crystal elastomer, a low molecular weight liquid crystal molecule, and a crosslinking monomer.

Optionally, the crosslinking monomer is a photopolymerizable monomer.

Optionally, the co-polymer comprises approximately 10% w/w to approximately 70% w/w liquid crystal elastomer, approximately 4% w/w to approximately 86.99% w/w low molecular weight liquid crystal monomeric unit, and approximately 3% w/w to approximately 25% w/w crosslinker unit.

Optionally, the liquid crystal elastomer is a siloxane liquid crystal elastomer.

Optionally, the liquid crystal elastomer is a siloxane liquid crystal elastomer having a structure of formula I:

wherein $R_1$ is a liquid crystal monomeric unit, $R_2$ is a crosslinker unit, and $R_3$ is selected from the group consisting of hydrogen, substituted or unsubstituted alkyl, substituted or unsubstituted hetero alkyl, substituted or unsubstituted cycloalkyl, substituted or unsubstituted heterocycloalkyl, substituted or unsubstituted aryl, and substituted or unsubstituted heteroaryl.

Optionally, $R_1$ is and $R_2$ is

Optionally, the low molecular weight liquid crystal molecule is selected from the group consisting of wherein * stands for a free radical.

Optionally, the actuator is an electrical actuator comprising a plurality of electrodes for actuating each of the plurality of color filter blocks.

Optionally, the actuator further comprises an electroactive layer; the electroactive layer comprises a plurality of electroactive blocks, each of which corresponding to one of the plurality of color filter blocks and each of the plurality of color filter blocks is configured to be actuated by one of the plurality of electroactive blocks so that the wavelength of light transmitted through each of the plurality of color filter blocks changes in response to a change in an electrical signal applied to the one of the plurality of color filter blocks.

Optionally, each of the plurality of electroactive blocks is configured to exert a force to one of the plurality of color filter blocks for changing a thickness of the one of the plurality of color filter blocks thereby controlling the wavelength of light transmitted through each of the plurality of color filter blocks.

Optionally, the plurality of color filter blocks comprises at least a plurality of first color filter blocks and a plurality of second color filter blocks; the plurality of electroactive blocks comprises at least a plurality of first electroactive blocks and a plurality of second electroactive blocks; each of the plurality of first electroactive blocks is configured to actuate one of the plurality of first color filter blocks so that light of a first color transmitted through each of the plurality of first color filter blocks; and each of the plurality of second electroactive blocks is configured to actuate one of the plurality of second color filter blocks so that light of a second color transmitted through each of the plurality of second color filter blocks.

Optionally, a projection of each of the plurality of color filter blocks on the base substrate at least partially overlaps with a projection of one of the plurality of electroactive blocks on the base substrate.

Optionally, the display substrate further comprises a black matrix in an inter-subpixel region of the display substrate; wherein a projection of the black matrix on the base substrate covers a projection of the plurality of electrodes on the base substrate.

In another aspect, the present invention provides a display apparatus, comprising the display substrate described herein.

In another aspect, the present invention provides a method of operating a display apparatus comprising the display substrate of any one of claims 1 to 17; the method comprising actuating each of the plurality of color filter blocks thereby controlling a wavelength of light transmitted through each of the plurality of color filter blocks.

Optionally, the method further comprises dividing the plurality of color filter blocks into N1 numbers of groups of color filter blocks in the first color display mode; dividing the plurality of color filter blocks into N2 numbers of groups of color filter blocks in the second color display mode, N1 and N2 being two different positive integers; actuating at least one group of the N1 groups of the color filter blocks in the first color display mode so that light transmitted through each group of the N1 groups of the color filter blocks has different colors; and actuating at least one group of the N2 groups of the color filter blocks in the second color display mode so that light transmitted through each group of the N2 groups of the color filter blocks has different colors.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display substrate, a display apparatus, and a method of operating a display apparatus that substantially obviate one or more of the problems due to limitations and disadvantages of the related art. In one aspect, the present disclosure provides a display substrate. In some embodiments, the display substrate includes a base substrate; a color filter on the base substrate and including a plurality of color filter blocks; and an actuator configured to actuate each of the plurality of color filter blocks thereby controlling (e.g., individually controlling) a wavelength alight transmitted through each of the plurality of color filter blocks. Optionally, the display substrate is an array substrate. Optionally, the display substrate is a color filter substrate.

In some embodiments, the plurality of color filter blocks include at least a plurality of first color filter blocks and a plurality of second color filter blocks. Optionally, the actuator is configured to actuate each of the plurality of first color filter blocks so that light of a first color transmitted through each of the plurality of first color filter blocks, and actuate each of the plurality of second color filter blocks so that light of a second color transmitted through each of the plurality of second color filter blocks, the first color being different from the second color.

In some embodiments, the plurality of color filter blocks include at least a plurality of first color filter blocks, a plurality of second color filter blocks, and a plurality of third color filter blocks (e.g., a plurality of red color filter blocks, a plurality of green color filter blocks, and a plurality of blue color filter blocks). Optionally, the actuator is configured to actuate each of the plurality of first color filter blocks so that light of a first color transmitted through each of the plurality of first color filter blocks, actuate each of the plurality of second color filter blocks so that light of a second color transmitted through each of the plurality of second color filter blocks, and actuate each of the plurality of third color filter blocks so that light of a third color transmitted through each of the plurality of third color filter blocks. The first color, the second color, and the third color are three different colors, e.g., red, green and blue.

In some embodiments, the plurality of color filter blocks include at least a plurality of first color filter blocks, a plurality of second color filter blocks, a plurality of third color filter blocks, and a plurality of fourth color filter blocks (e.g., a plurality of red color filter blocks, a plurality of green color filter blocks, a plurality of blue color filter blocks, and a plurality of white color filter blocks). Optionally, the actuator is configured to actuate each of the plurality of first color filter blocks so that light of a first color transmitted through each of the plurality of first color filter blocks, actuate each of the plurality of second color filter blocks so that light of a second color transmitted through each of the plurality of second color filter blocks, actuate each of the plurality of third color filter blocks so that light of a third color transmitted through, each of the plurality of third color filter blocks. Optionally, the actuator is configured to actuate each of the plurality of fourth color filter blocks so that light of a fourth color transmitted through each of the plurality of fourth color filter blocks. Optionally, the plurality of fourth color filter blocks are substantially not actuated by the actuator so that a back light transmits substantially through the plurality of fourth color filter blocks. The first color, the second color, the third color, and the fourth color are four different colors, e.g., red, green, blue, and white.

Various appropriate actuators may be used for actuating the plurality of color filter blocks. Examples of appropriate actuators include electrical actuators, mechanical actuators, and piezoelectric actuators, electro-mechanical actuators, and so on. Because the present display substrate uses an actuator to actuate each of the plurality of color filter blocks for controlling a wavelength of light transmitted through each of the plurality of color filter blocks, the light transmitted through each of the plurality of color filter blocks can be tunable. Thus, the color filter in the present display substrate can be readily switched between two different color filtering modes. In one example, the color filter in the present display substrate is a red/green/blue (RGB) color filter. In another example, the color filter in the present display substrate is a red/green/blue/white color filter. In another example, the color filter in the present display substrate can be switched between a RGB color filter and a RGBW color filter.

Figure 1:
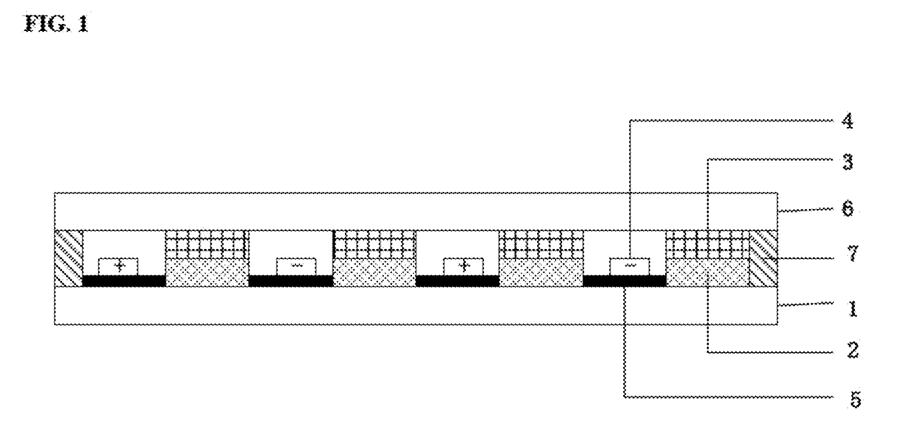
FIG. 1 is a schematic diagram illustrating the structure of a display substrate in some embodiments according to the present disclosure.

FIG. 1 is a schematic diagram illustrating the structure of a display substrate in some embodiments according to the present disclosure. Referring to FIG. 1, the display substrate in some embodiments includes a base substrate 1, a color filter having a plurality of color filter blocks 3 on the base substrate 1, and an actuator for actuating each of the plurality of color filter blocks 3 and controlling a wavelength of light transmitted through each of the plurality of color filter blocks 3. As shown in FIG. 1, the actuator in some embodiments includes a plurality of electrodes 4 for actuating each of the plurality of color filter blocks 2. Optionally, the actuator further includes an electroactive layer having a plurality of electroactive blocks 2. Each of the plurality of electroactive blocks 2 corresponds to one of the plurality of color filter blocks 3. Each of the plurality of color filter blocks 3 is configured to be actuated by one of the plurality of electroactive blocks 2 so that the wavelength of light transmitted through each of the plurality of color filter blocks 3 changes in response to a change in an electrical signal applied to the one of the plurality of electroactive blocks 2 (e.g., through the plurality of electrodes 4). Optionally, each of the plurality of electroactive blocks 2 is configured to exert a force to one of the plurality of color filter blocks 3 for changing a thickness of the one of the plurality of color filter blocks 3 thereby controlling the wavelength of light transmitted through each of the plurality of color filter blocks 3.

In some embodiments, the actuator is configured to control a thickness of each of the plurality of color filter blocks 3 thereby controlling the wavelength of light transmitted through the plurality of color filter blocks 3. Optionally, each of the plurality of color filter blocks 3 includes a liquid crystal elastomer. Liquid crystal molecules are chiral nematics that is capable of reflecting light of certain wavelength(s) and allowing light of other wavelength(s) to pass through. The wavelength of light reflected by the liquid crystal molecules is correlated with a pitch of the liquid crystal molecules (e.g., a liquid crystal elastomer). The light not reflected by the liquid crystal molecules passes through the liquid crystal molecules.

Figure 2:
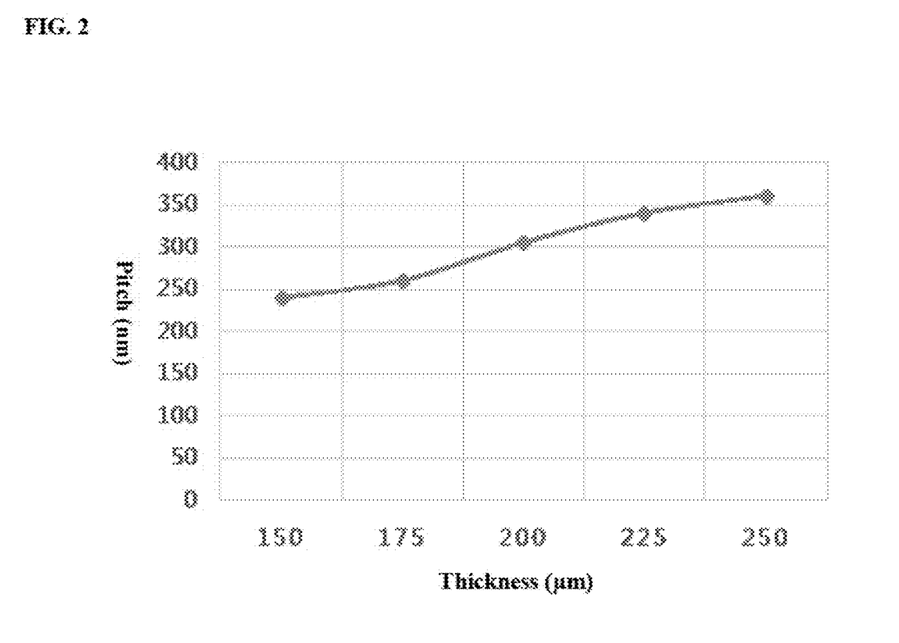
FIG. 2 illustrates a correlation between pitch and thickness of a liquid crystal elastomer.

FIG. 2 illustrates a correlation between pitch and thickness of a liquid crystal elastomer. Referring to FIG. 2, the pitch of the liquid crystal elastomer and the thickness of the liquid crystal elastomer substantially along the light path direction are substantially linearly correlated, e.g., the greater the thickness, the greater the pitch. Based on Bragg's law, $\lambda=\Delta n*P$, the wavelength of light reflected by the liquid crystal elastomer can be calculated, wherein $\lambda$ is the wavelength of reflected light, $\Delta n$ is a birefringence index of the liquid crystal elastomer, and P is the pitch of the liquid crystal elastomer. Accordingly, the wavelength of light transmitted through the liquid crystal elastomer can be calculated.

Figure 3:
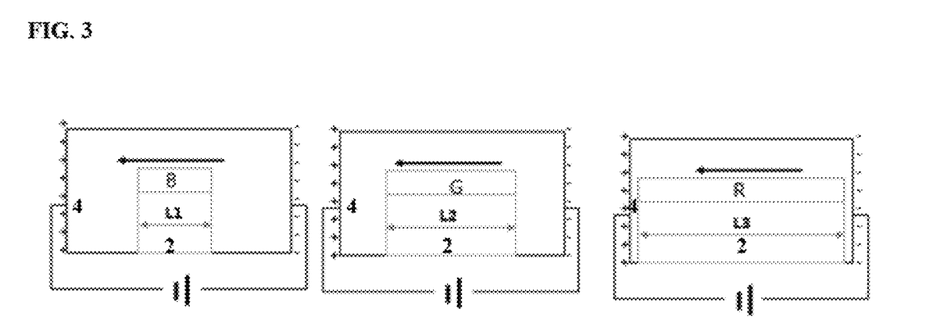
FIG. 3 illustrates a working principle of a color filter in a display substrate in some embodiments according to the present disclosure.

FIG. 3 illustrates a working principle of a color filter in a display substrate in some embodiments according to the present disclosure. Referring to FIG. 3, the plurality of color filter blocks include a red color filter block R, a green color filter block G, and a blue color filter block B. Each of the red color filter block R, the green color filter block G, and the blue color filter block B includes a liquid crystal elastomer. The thickness of the red color filter block R, the green color filter block G, and the blue color filter block B can be controlled by an electrical signal (e.g., a voltage) applied to each of the red color filter block R, the green color filter block G, and the blue color filter block B. In some embodiments, each of the electroactive blocks 2 includes an electroactive material (e.g., a piezoelectric material).

When an electrical signal is applied to the electroactive layer (e.g., to one of the plurality of electroactive blocks 2), the electrical signal reversibly changes one or more characteristic body dimension of the one of the plurality of electroactive blocks 2, i.e., the one of the plurality of electroactive blocks 2 exhibits a distortion upon receiving the applied electrical signal. As a result of this distortion, the one of the plurality of electroactive blocks 2 may reversibly expand or retract in one or more dimension, and the expansion or retraction of the one of the plurality of electroactive blocks 2 presses or pulls the corresponding one of the plurality of color filter blocks 3 (which is made of a liquid crystal elastomer). The one of the plurality of color filter blocks 3 is coupled to (e.g., in contact with) the corresponding one of the plurality of electroactive blocks 2 so that the corresponding one of the plurality of electroactive blocks 2 may exert a force to the one of the plurality of color filter blocks 3 when it reversibly expands or retracts in one or more dimension. In some embodiments, the one of the plurality of electroactive blocks 2 exerts a force to the corresponding one of the plurality of color filter blocks 3 for changing the thickness of the corresponding one of the plurality of color filter blocks 3 in response to the change in the strength of the electrical signal applied to the one of the plurality of electroactive blocks 2.

In some embodiments, the change in the wavelength of light transmitted through one of the plurality of color filter blocks 3 occurs as a result of a change in a thickness of the one of the plurality of color filter blocks 3 in response to the change in the electrical signal applied to the corresponding one of the plurality of electroactive blocks 2. For example, the wavelength of light transmitted through one of the plurality of color filter blocks 3 may decrease as the thickness of the one of the plurality of color filter blocks 3 increases in response to the electrical signal applied to the corresponding one of the plurality of electroactive blocks 2, and then the wavelength of light transmitted through one of the plurality of color filter blocks 3 may increase as the thickness of the one of the plurality of color filter blocks 3 decreases in response to the electrical signal applied to the corresponding one of the plurality of electroactive blocks 2. Referring to FIG. 3, by applying different electrical signals respectively to the plurality of electroactive blocks 2 corresponding to the red color filter block R, the green color filter block G, and the blue color filter block B, the wavelengths of light allowed to transmit through each of the red color filter block R, the green color filter block G, and the blue color filter block B are made different. For example, a red light is allowed to transmit through the red color filter block R, a green light is allowed to transmit through the green color filter block G, and a blue light is allowed to transmit through the blue color filter block B.

In some embodiments, the change in the wavelength of light transmitted through each of the plurality of color filter blocks 3 occurs as a result of a change in a length or width of the corresponding one of the plurality of electroactive blocks 2 in response to the change the electrical signal applied to the corresponding one of the plurality of electroactive blocks 2. For example, the change in the length or width of the corresponding one of the plurality of electroactive blocks 2 exerts a force to the corresponding one of the plurality of color filter blocks 3, thereby changing the thickness of the one of the plurality of color filter blocks 3. Optionally, the length or width of the corresponding one of the plurality of electroactive blocks 2 is a length or width along a direction substantially perpendicular to the thickness direction of the one of the plurality of color filter blocks 3. In some embodiments, the wavelength of light transmitted through each of the plurality of color filter blocks 3 may decrease as the length or width of the corresponding one of the plurality of electroactive blocks 2 decreases in response the electrical signal applied to the corresponding one of the plurality of electroactive blocks 2, and the wavelength of light transmitted through each of the plurality of color filter blocks 3 may increase as length or width of the corresponding one of the plurality of electroactive blocks 2 increases in response to the electrical signal applied to the corresponding one of the plurality of electroactive blocks 2. As shown in FIG. 3, by applying different electrical signals respectively to the plurality of electroactive blocks 2 corresponding to the red color filter block R, the green color filter block G, and the blue color filter block B, the length or width of the plurality of electroactive blocks 2 corresponding to the red color filter block R, the green color filter block G, and the blue color filter block B can be adjusted to be different, e.g., a length L1 for the one of the plurality of electroactive blocks 2 corresponding to the blue color filter block B, a length L2 for the one of the plurality of electroactive blocks 2 corresponding to the green color filter block G, and a length L3 for the one of the plurality of electroactive blocks 2 corresponding to the red color filter block R. Optionally, L1<L2<L3. By having a length L1 for the one of the plurality of electroactive blocks 2 corresponding to the blue color filter block B, a blue light is allowed to transmit through the blue color filter block B (e.g., light of other colors is reflected by the blue color filter block B). By having a length L2 for the one of the plurality of electroactive blocks 2 corresponding to the green color filter block G, a green light is allowed to transmit through the green color filter block G (e.g., light of other colors is reflected by the green color filter block G). By having a length L3 for the one of the plurality of electroactive blocks 2 corresponding to the red color filter block R, a red light is allowed to transmit through the red color filter block R (e.g., light of other colors is reflected by the red color filter block R).

In some embodiments, the change in wavelength of light transmitted through each of the plurality of color filter blocks 3 occurs as a result of a change in a length of the corresponding one of the plurality of electroactive blocks 2 along a polarization direction of the corresponding one of the plurality of electroactive blocks 2 in response to the change in the electrical signal applied to the corresponding one of the plurality of electroactive blocks 2. Optionally, the polarization direction of the corresponding one of the plurality of electroactive blocks 2 is substantially perpendicular to the thickness direction of the one of the plurality of color filter blocks 3. Accordingly, in some embodiments, the wavelength of light transmitted through each of the plurality of color filter blocks 3 may decrease as the length of the corresponding one of the plurality of electroactive blocks 2 along a polarization direction of the corresponding one of the plurality of electroactive blocks 2 decreases in response to the electrical signal applied to the corresponding one of the plurality of electroactive blocks 2, and the wavelength of light transmitted through each of the plurality of color filter blocks 3 may increase as length of the corresponding one of the plurality of electroactive blocks 2 along a polarization direction of the corresponding one of the plurality of electroactive blocks 2 increases in response to the electrical signal applied to the corresponding one of the plurality of electroactive blocks 2.

In some embodiments, the electrical signal is applied to the corresponding one of the plurality of electroactive blocks 2 to form an electrical field having a direction substantially parallel to the polarization direction of the corresponding one of the plurality of electroactive blocks 2. As shown in FIG. 3, the polarization direction of the plurality of electroactive blocks 2 is depicted in arrows. By applying different electrical signals respectively to the plurality of electroactive blocks 2 corresponding to the red color filter block R, the green color filter block G, and the blue color filter block B along the polarization direction of the plurality of electroactive blocks 2, the length or width of the plurality of electroactive blocks 2 corresponding to the red color filter block R, the green color filter block G, and the blue color filter block B can be adjusted to be different, e.g., a length L1 for the one of the plurality of electroactive blocks 2 corresponding to the blue color filter block B, a length L2 for the one of the plurality of electroactive blocks 2 corresponding to the green color filter block G, and a length L3 for the one of the plurality of electroactive blocks 2 corresponding to the red color filter block R. Optionally, L1<L2<L3. By having a length L1 for the one of the plurality of electroactive blocks 2 corresponding to the blue color filter block B, a blue light is allowed to transmit through the blue color filter block B (e.g., light of other colors is reflected by the blue color filter block B). By having a length L2 for the one of the plurality of electroactive blocks 2 corresponding to the green color filter block G, a green light is allowed to transmit through the green color filter block G (e.g., light of other colors is reflected by the green color filter block G). By having a length L3 for the one of the plurality of electroactive blocks 2 corresponding to the red color filter block R, a red light is allowed to transmit through the red color filter block R (e.g., light of other colors is reflected by the red color filter block R).

In some embodiments, a pair of electrodes of the plurality of electrodes 4 is disposed on two opposite sides of the one of the plurality of electroactive blocks 2 for applying an electrical signal, e.g., generating an electrical field having a direction substantially parallel to the polarization direction of the one of the plurality of electroactive blocks 2. In one example, the pair of electrodes of the plurality of electrodes 4 respectively applies a positive voltage and a negative voltage to the two opposite sides of the one of the plurality of electroactive blocks 2, e.g., forming an electrical field having a direction substantially parallel to a plane of the base substrate 1 (horizontal direction). The inverse piezoelectric effect produced by the electrical field on the one of the plurality of electroactive blocks 2 results in reflection of light of certain wavelength(s) by the corresponding one of the plurality of color filter blocks 3. The remaining light transmits through the corresponding one of the plurality of color filter blocks 3, achieving color filtering.

Various appropriate materials may be used for making the plurality of color filter blocks 3. In some embodiments, each of the plurality of color filter blocks 3 is made of a material having a liquid crystal elastomer. Optionally, each of the plurality of color filter blocks 3 includes a co-polymer of a liquid crystal elastomer, a low molecular weight liquid crystal molecule, and a crosslinking monomer. In one example, each of the plurality of color filter blocks 3 is made by co-polymerizing a mixture including a liquid crystal elastomer, a low molecular weight liquid crystal molecule, and a crosslinking monomer. Optionally, the crosslinking monomer is a photopolymerizable monomer, and each of the plurality of color filter blocks 3 is made by co-polymerizing a mixture including a liquid crystal elastomer, a low molecular weight liquid crystal molecule, a photopolymerizable monomer, and a photo-initiator. In one example, the co-polymer includes approximately 10% w/w to approximately 70% w/w liquid crystal elastomer, approximately 4% w/w to approximately 86.99% w/w low molecular weight liquid crystal monomeric unit, and approximately 3% w/w to approximately 25% w/w crosslinker unit. In another example, the co-polymer is formed by co-polymerizing a mixture including approximately 10% w/w to approximately 70% w/w liquid crystal elastomer, approximately 4% w/w to approximately 86.99% w/w low molecular weight liquid crystal molecule, approximately 3% w/w to approximately 25% w/w photopolymerizable monomer, and approximately 0.0% w/w to approximately 1% w/w photo-initiator.

In some embodiments, the liquid crystal elastomer is a siloxane liquid crystal elastomer. Optionally, the liquid crystal elastomer is a siloxane main-chain liquid crystal elastomer. Optionally, the liquid crystal elastomer is a siloxane side-chain liquid crystal elastomer. Optionally, the liquid crystal elastomer is a siloxane main-chain liquid crystal elastomer haying a structure of formula I:

wherein $R_1$ is a liquid crystal monomeric unit, and $R_2$ is a crosslinker unit. Optionally, $R_1$ is a cholesteric liquid crystal monomeric unit. Optionally, $R_1$ is Optionally, $R_2$ is In some embodiments, the crosslinking monomer is selected from the group consisting of wherein * stands for a free radical.

In some embodiments, the low molecular weight liquid crystal molecule is selected from the group consisting of SLC1717 (Slichem Shijiazimang Chengzhi Yonghua Display Materials Co., Ltd.), DIC0773 (DIC Corporation), and Merck1284 (Merck & Co. Inc.).

Optionally, the color filter (e.g., each of the plurality of color filter blocks 3) has a thickness in a range of approximately 500 Å to approximately 5000 Å.

Various appropriate electroactive materials may be used for making the electroactive layer. As used herein the term "electroactive material" refers to a material that reversibly changes one or more characteristic body dimension by an amount depending on an applied electrical voltage. As used herein, the term "electroactive layer" refers to a layer in the present display substrate that includes an electroactive material, and is capable of reversibly changing one or more characteristic body dimension by an amount depending on an applied electrical voltage. Optionally, the electroactive material is an electrostrictive material. Stress and strain response of the electrostrictive material to an electric field is proportional to the square of the electric field. Optionally, the electroactive material is a piezoelectric material. Stress and strain response of the piezoelectric material to an electric field is proportional to the electric field. Optionally, the electroactive material is a substantially transparent electroactive material.

Examples of appropriate electrostrictive materials include, but are not limited to, lithium niobite, a polyurethane containing material (e.g., a doped polyurethane material), polyvinylidene fluoride, lead magnesium niobate, lead magnesium niobate-lead titanate, lanthanum doped lead zirconate titanate, barium doped lead zirconate titanate, and various substitutes and derivatives thereof (e.g., doped with one or more dopant).

Examples of appropriate piezoelectric materials include, but are not limited to, quartz, lead zirconium titanate, bedinite, zinc oxide, barium titanate, lead titanate, and various substitutes and derivatives thereof (e.g., doped with one or more dopant).

Optionally, the electroactive layer (e.g., each of the plurality of electroactive blocks 2) has a thickness in a range of approximately 500 Å to approximately 5000 Å.

Various appropriate electrode materials may be used for making the plurality of electrodes 4. Optionally, the plurality of electrodes 4 are made of a substantially transparent conductive material. Examples of appropriate conductive materials include metal oxides such as indium tin oxide.

In some embodiments, the plurality of color filter blocks 3 include at least a plurality of first color filter blocks and a plurality of second color filter blocks; and the plurality of electroactive blocks 2 include at least a plurality of first electroactive blocks and a plurality of second electroactive blocks. Optionally, the actuator is configured to actuate each of the plurality of first color filter blocks so that light of a first color transmitted through each of the plurality of first color filter blocks, and actuate each of the plurality of second color filter blocks so that light of a second color transmitted through each of the plurality of second color filter blocks, the first color being different from the second color. Optionally, each of the plurality of first electroactive blocks is configured to actuate one of the plurality of first color filter blocks so that light of a first color transmitted through each of the plurality of first color filter blocks. Optionally, each of the plurality of second electroactive blocks is configured to actuate one of the plurality of second color filter blocks so that light of a second color transmitted through each of the plurality of second color filter blocks.

In some embodiments, the plurality of color filter blocks include at least a plurality of first color filter blocks, a plurality of second color filter blocks, and a plurality of third color filter blocks (e.g., a plurality of red color filter blocks, a plurality of green color filter blocks, and a plurality of blue color filter blocks); and the plurality of electroactive blocks 2 include at least a plurality of first electroactive blocks, a plurality of second electroactive blocks, and a plurality of third electroactive blocks. Optionally, the actuator is configured to actuate each of the plurality of first color filter blocks so that light of a first color transmitted through each of the plurality of first color filter blocks, actuate each of the plurality of second color filter blocks so that light of a second color transmitted through each of the plurality of second color filter blocks, and actuate each of the plurality of third color filter blocks so that light of a third color transmitted through each of the plurality of third color filter blocks. The first color, the second color, and the third color are three different colors, e.g., red, green and blue. Optionally, each of the plurality of first electroactive blocks is configured to actuate one of the plurality of first color filter blocks so that light of a first color transmitted through each of the plurality of first color filter blocks. Optionally, each of the plurality of second electroactive blocks is configured to actuate one of the plurality of second color filter blocks so that light of a second color transmitted through each of the plurality of second color filter blocks. Optionally, each of the plurality of third electroactive blocks is configured to actuate one of the plurality of third color filter blocks so that light of a third color transmitted through each of the plurality of third color filter blocks.

In some embodiments, the plurality of color filter blocks include at least a plurality of first color filter blocks, a plurality of second color filter blocks, a plurality of third color filter blocks, and a plurality of fourth color filter blocks (e.g., a plurality of red color filter blocks, a plurality of green color filter blocks, a plurality of blue color filter blocks, and a plurality of white color filter blocks); and the plurality of electroactive blocks 2 include at least a plurality of first electroactive blocks, a plurality of second electroactive blocks, and a plurality of third electroactive blocks. Optionally, the plurality of electroactive blocks 2 further include a plurality of fourth electroactive blocks. Optionally, the actuator is configured to actuate each of the plurality of first color filter blocks so that light of a first color transmitted through each of the plurality of first color filter blocks, actuate each of the plurality of second color filter blocks so that light of a second color transmitted through each of the plurality of second color filter blocks, actuate each of the plurality of third color filter blocks so that light of a third color transmitted through each of the plurality of third color filter blocks. Optionally, the actuator is further configured to actuate each of the plurality of fourth color filter blocks so that light of a fourth color transmitted through each of the plurality of fourth color filter blocks. Optionally, the plurality of fourth color filter blocks are substantially not actuated by the actuator so that a back light transmits substantially through the plurality of fourth color filter blocks. The first color, the second color, the third color, and the fourth color are four different colors, e.g., red, green, blue, and white. Optionally, each of the plurality of first electroactive blocks is configured to actuate one of the plurality of first color filter blocks so that light of a first color transmitted through each of the plurality of first color filter blocks. Optionally, each of the plurality of second electroactive blocks is configured to actuate one of the plurality of second color filter blocks so that light of a second color transmitted through each of the plurality of second color filter blocks. Optionally, each of the plurality of third electroactive blocks is configured to actuate one of the plurality of third color filter blocks so that light of a third color transmitted through each of the plurality of third color filter blocks. Optionally, each of the plurality of fourth electroactive blocks is configured to actuate one of the plurality of fourth color filter blocks so that light of a fourth color transmitted through each of the plurality of fourth color filter blocks.

Referring to FIG. 1, the display substrate in some embodiments further includes a second base substrate 6 facing the base substrate 1. Specifically, the display substrate in FIG. 1 includes an electroactive layer having a plurality of electroactive blocks 2 in subpixel regions of the display substrate, a color filter having a plurality of color filter blocks 3 on a side of the electroactive layer distal to the base substrate 1, a black matrix in an inter-subpixel region of the display substrate, a plurality of electrodes 4 in the inter-subpixel region of the display substrate and on a side of the black matrix 5 distal to the base substrate 1, and a second base substrate 6 on a side of the color filter distal to the base substrate 1. Each of the plurality of electroactive blocks 2 is electrically connected to a pair of electrodes of the plurality of electrodes 4 on two opposite sides of each of the plurality of electroactive blocks 2. Optionally, the display substrate further includes a seal frame 7 for sealing the base substrate 1 and the second base substrate 6 together.

Referring to FIG. 1, the black matrix 5, the color filter, and the electroactive layer are on a same side of the base substrate 1. Optionally, a projection of each of the plurality of color filter blocks 3 on the base substrate 1 at least partially overlaps with a projection of one of the plurality of electroactive blocks 2 on the base substrate 1. Optionally, the projection of each of the plurality of color filter blocks 3 on the base substrate 1 substantially overlaps with the projection of one of the plurality of electroactive blocks 2 on the base substrate 1. Optionally, a projection of the black matrix 5 on the base substrate 1 substantially covers a projection of the plurality of electrodes 4 on the base substrate 1.

As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region off white color subpixel.

As used herein, an inter-subpixel region refers to a region between adjacent subpixel regions, such as a region corresponding to a black matrix in a liquid crystal display, a region corresponding a pixel definition layer in an organic light emitting diode display panel, or a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

Figure 4:
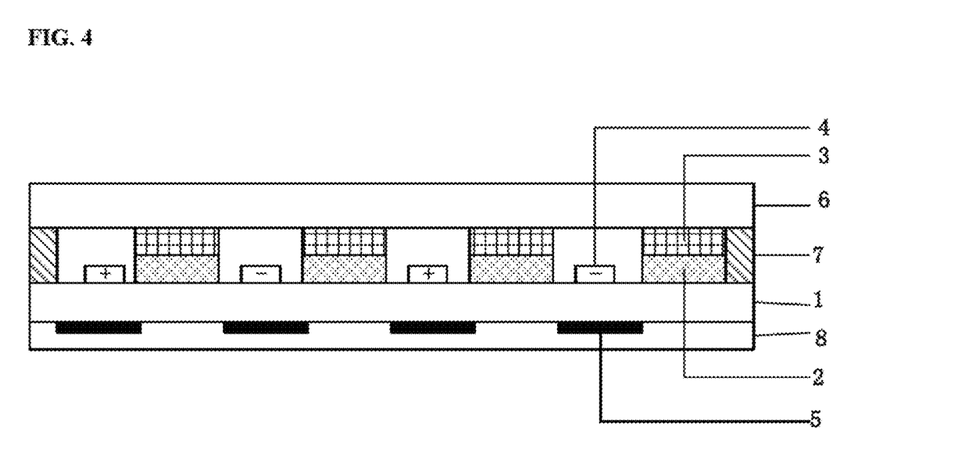
FIG. 4 is a schematic diagram illustrating the structure of a display substrate m some embodiments according to the present disclosure.

FIG. 4 is a schematic diagram illustrating the structure of a display substrate in some embodiments according to the present disclosure. Referring to FIG. 4, the display substrate in some embodiments includes a passivation layer 8, a black matrix 5 in an inter-subpixel region of the display substrate and on the passivation layer 8, a base substrate 1 on a side of the black matrix 5 distal to the passivation layer 8, an electroactive layer having a plurality of electroactive blocks 2 in subpixel regions of the display substrate and on a side of the base substrate 1 distal to the black matrix 5, a color filter having a plurality of color filter blocks 3 on a side of the electroactive layer distal to the base substrate 1, a plurality of electrodes 4 in the inter-subpixel region of the display substrate and on a side of the base substrate 1 distal to the black matrix 5, and a second base substrate 6 on a side of the color filter distal to the base substrate 1. Each of the plurality of electroactive blocks 2 is electrically connected to a pair of electrodes of the plurality of electrodes 4 on two opposite sides of each of the plurality of electroactive blocks 2. Optionally, the display substrate further includes a seal frame 7 for sealing the base substrate 1 and the second base substrate 6 together.

Referring to FIG. 4, the black matrix 5 is on a first side of the base substrate 1, the color filter and the electroactive layer are on a second side of the base substrate 1, the second side and the first side being opposite to each other. Optionally, a projection of each of the plurality of color filter blocks 3 on the base substrate 1 at least partially overlaps with a projection of one of the plurality of electroactive blocks 2 on the base substrate 1. Optionally, the projection of each of the plurality of color filter blocks 3 on the base substrate 1 substantially overlaps with the projection of one of the plurality of electroactive blocks 2 on the base substrate 1. Optionally, a projection of the black matrix 5 on the base substrate 1 substantially covers a projection of the plurality of electrodes 4 on the base substrate 1.

Figure 5:
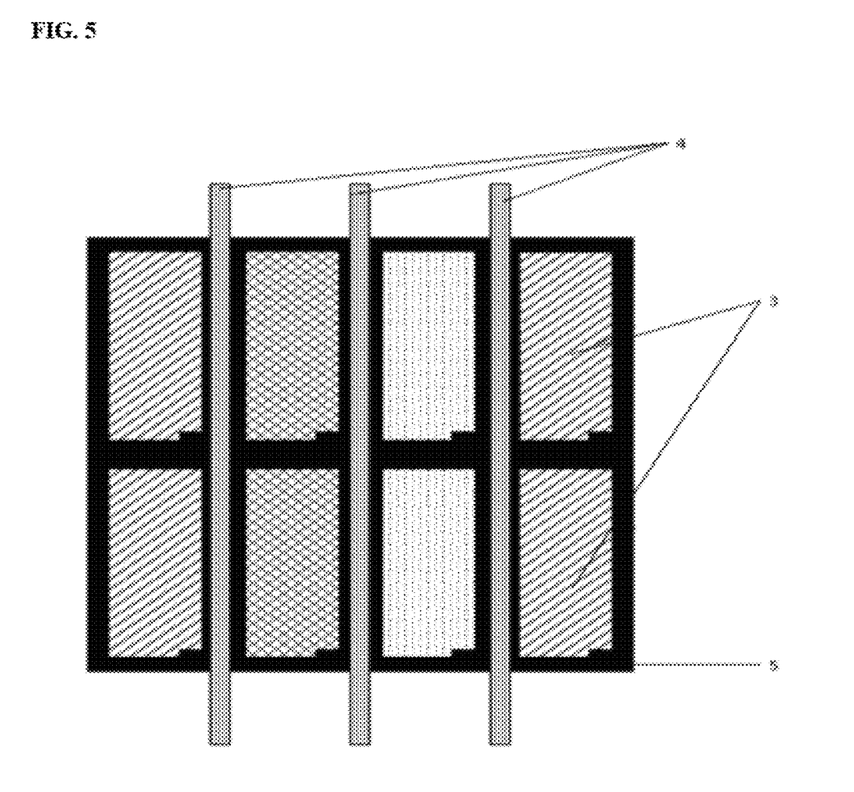
FIG. 5 is a schematic diagram illustrating the structure of a display substrate in some embodiments according to the present disclosure.

FIG. 5 is a schematic diagram illustrating the structure of a display substrate in some embodiments according to the present disclosure. Referring to FIG. 5, the display substrate includes a plurality of electrodes 4 in the inter-subpixel region of the display substrate. Each of the plurality of electrodes 4 is between two immediately adjacent columns of color filter blocks of the plurality of color filter blocks 3. Each column of color filter blocks of the plurality of color filter blocks 3 include color filter blocks of a same color. Two immediately adjacent columns of the plurality of color filter blocks 3 include color filter blocks of different colors. In one example, and referring to FIG. 5, the display substrate includes a column of red color filter blocks, a column of green color filter blocks, a column of blue color filter blocks, and then another column of red color filter blocks. The display substrate further includes one of the plurality of electrodes 4 between the column of red color filter blocks and the column of green color filter blocks, one of the plurality of electrodes 4 between the column of green color filter blocks and the column of blue color filter blocks, and one of the plurality of electrodes 4 between the column of blue color filter blocks and the column of red color filter blocks.

Figure 6:
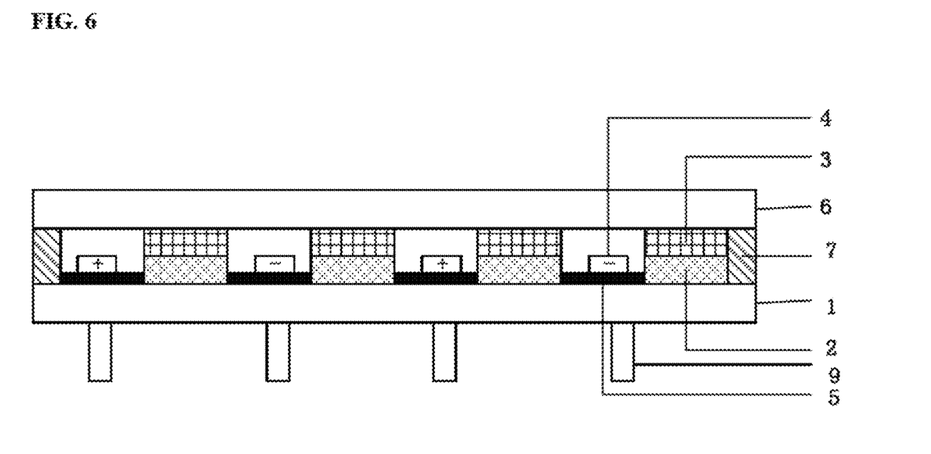
FIG. 6 is a schematic diagram illustrating the structure of a display substrate in some embodiments according to the present disclosure.

FIG. 6 is a schematic diagram illustrating the structure of a display substrate in some embodiments according to the present disclosure. Referring to FIG. 6, the display substrate in some embodiments further includes a spacer layer 9 in the inter-subpixel region of the display substrate. Optionally, the spacer layer 9 is on a side of the base substrate 1 distal to the black matrix 5. The spacer layer 9 and the black matrix 5 are on two opposite sides of the base substrate 1. Optionally, a projection of the black matrix 5 on the base substrate 1 substantially covers a projection of the spacer layer 9 on the base substrate 1.

Figure 7:
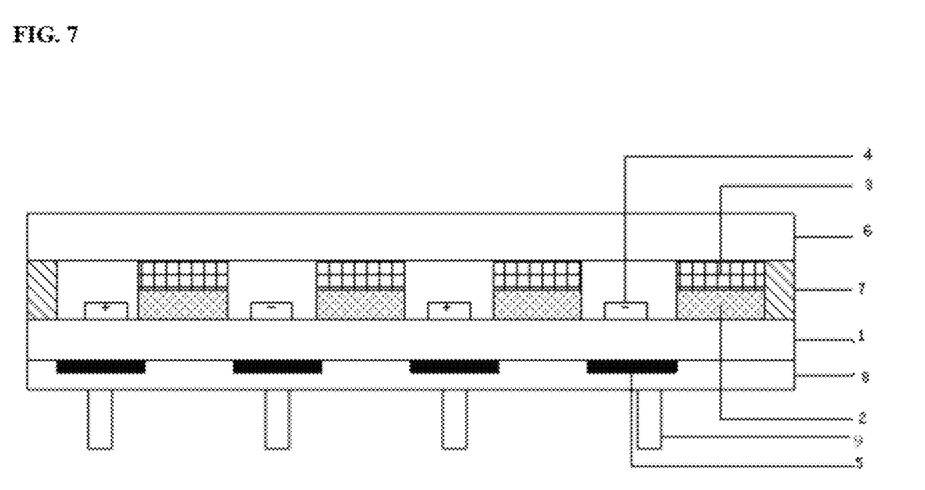
FIG. 7 is a schematic diagram illustrating the structure of a display substrate in some embodiments according to the present disclosure.

FIG. 7 is a schematic diagram illustrating the structure of a display substrate in some embodiments according to the present disclosure. Referring to FIG. 7, the display substrate in some embodiments further includes a spacer layer 9 in the inter-subpixel region of the display substrate. Optionally, the spacer layer 9 is on a side of the passivation layer 8 distal to the black matrix 5. The spacer layer 9 and the black matrix 5 are on two opposite sides of the passivation layer 8. Optionally, a projection of the black matrix 5 on the base substrate 1 substantially covers a projection of the spacer layer 9 on the base substrate 1.

In another aspect, the present disclosure provides a method of fabricating a display substrate. In some embodiments, the method includes forming a color filter having a plurality of color filter blocks on a base substrate; and forming an actuator configured to actuate each of the plurality of color filter blocks thereby controlling a wavelength of light transmitted through each of the plurality of color filter blocks. Optionally, the step of forming the color filter includes forming at least a plurality of first color filter blocks and a plurality of second color filter blocks; and the actuator is formed to actuate each of the plurality of first color filter blocks so that light of a first color transmitted through each of the plurality of first color filter blocks, and actuate each of the plurality of second color filter blocks so that light of a second color transmitted through each of the plurality of second color filter blocks, the first color being different from the second color. Optionally, the actuator is formed to control a thickness of each of the plurality of color filter blocks thereby controlling the wavelength of light transmitted through the plurality of color filter blocks.

In some embodiments, the step of forming the color filter includes forming the plurality of color filter blocks using a material including a liquid crystal elastomer. Optionally, the step of forming the color filter includes forming the plurality of color filter blocks using a co-polymer of a liquid crystal elastomer, a low molecular weight liquid crystal molecule, and a crosslinking monomer. Optionally, the step of forming the color filter includes co-polymerizing a mixture including a liquid crystal elastomer, a low molecular weight liquid crystal molecule, and a crosslinking monomer. Optionally, the crosslinking monomer is a photopolymerizable monomer, and the step of forming the color filter includes co-polymerizing a mixture including a liquid crystal elastomer, a low molecular weight liquid crystal molecule, the photopolymerizable monomer, and a photo-initiator. Optionally, the co-polymer includes approximately 10% w/w to approximately 70% w/w liquid crystal elastomer, approximately 4% w/w to approximately 86.99% w/w low molecular weight liquid crystal monomeric unit, and approximately 3% w/w to approximately 25% w/w crosslinker unit. Optionally, step of forming the color filter includes co-polymerizing a mixture including approximately 10% w/w to approximately 70% w/w liquid crystal elastomer, approximately 4% w/w to approximately 86.99% w/w low molecular weight liquid crystal molecule, and approximately 3% w/w to approximately 25% w/w crosslinking monomer. Optionally, the crosslinking monomer is a photopolymerizable monomer, and the step of forming the color filter includes co-polymerizing a mixture including approximately 10% w/w to approximately 70% w/w liquid crystal elastomer, approximately 4% w/w to approximately 86.99% w/w low molecular weight liquid crystal molecule, approximately 3% w/w to approximately 25% w/w photopolymerizable monomer, and approximately 0.01% w/w to approximately 1% w/w photo-initiator.

In some embodiments, the liquid crystal elastomer is a siloxane liquid crystal elastomer. Optionally, the siloxane liquid crystal elastomer is a siloxane main-chain liquid crystal elastomer. Optionally, the siloxane liquid crystal elastomer is a siloxane side-chain liquid crystal elastomer. Optionally, the liquid crystal elastomer is a siloxane liquid crystal elastomer having a structure of formula I:

(I)

wherein $R_1$ is a liquid crystal monomeric unit, $R_2$ is a crosslinker unit, and $R_3$ is selected from the group consisting of hydrogen, substituted or unsubstituted alkyl (e.g. substituted or unsubstituted $C_1$ to $C_{20}$ alkyl), substituted or unsubstituted heteroalkyl (e.g. substituted or unsubstituted 2 to 20 membered heteroalkyl), substituted or unsubstituted cycloalkyl (e.g. $C_3$ to $C_{14}$ cycloalkyl including fused ring structures), substituted or unsubstituted heterocycloalkyl (e.g. 3 to 14 membered heterocycloalkyl including fused ring structures), substituted or unsubstituted aryl (e.g. a $C_6$ to $C_{14}$ aryl including fused ring structures), and substituted or unsubstituted heteroaryl (e.g. 5 to 14 membered heteroaryl including fused rings structures). Optionally, $R_3$ is methyl.

Optionally, the liquid crystal elastomer is a siloxane liquid crystal elastomer having a structure of formula II:

(II)

wherein $R_1$ is a liquid, crystal monomeric unit, and $R_2$ is a crosslinker unit.

Optionally, $R_1$ is a cholesteric liquid crystal monomeric unit. Optionally, $R_1$ is or Optionally, $R_2$ is or In some embodiments, the crosslinking monomer is selected from the group consisting of wherein * stands for a free radical.

In some embodiments, the low molecular weight liquid crystal molecule is selected from the group consisting of SLC1717 (Slichem Shijiazhuang Chengzhi Yonghua Display Materials Co., Ltd.), DIC0773 (DIC Corporation), and Merck1284 (Merck & Co. Inc.).

In some embodiments, the step of forming the actuator includes forming a plurality of electrodes for actuating each of the plurality of color filter blocks. Optionally, the step of forming the actuator further includes forming an electroactive layer haying a plurality of electroactive blocks, each of which corresponding to one of the plurality of color filter blocks. Optionally, each of the plurality of color filter blocks is formed to be actuated by one of the plurality of electroactive blocks so that the wavelength of light transmitted through each of the plurality of color filter blocks changes in response to a change in an electrical signal applied to the one of the plurality of electroactive blocks. Optionally, each of the plurality of electroactive blocks is formed to exert a force to one of the plurality of color filter blocks for changing a thickness of the one of the plurality of color filter blocks thereby controlling the wavelength of light transmitted through each of the plurality of color filter blocks. Optionally, the step of forming the color filter includes forming at least a plurality of first color filter blocks and a plurality of second color filter blocks; and the step of forming the electroactive layer includes forming at least a plurality of first electroactive blocks and a plurality of second electroactive blocks. Optionally, each of the plurality of first electroactive blocks is formed to actuate one of the plurality of first color filter blocks so that light of a first color transmitted through each of the plurality of first color filter blocks. Optionally, each of the plurality of second electroactive blocks is formed to actuate one of the plurality of second color filter blocks so that light of a second color transmitted through each of the plurality of second color filter blocks.

Optionally, the color filter and the electroactive layer are formed so that a projection of each of the plurality of color filter blocks on the base substrate at least partially overlaps with a projection of one of the plurality of electroactive blocks on the base substrate. Optionally, the color filter and the electroactive layer are formed so that a projection of each of the plurality of color filter blocks on the base substrate substantially overlaps with a projection of one of the plurality of electroactive blocks on the base substrate.

In some embodiments, the method further includes forming a black matrix in an inter-subpixel region of the display substrate. Optionally, the black matrix and the plurality of electrodes are formed so that a projection of the black matrix layer on the base substrate covers a projection of the plurality of electrodes on the base substrate.

In another aspect the present disclosure provides a display apparatus having the display substrate described herein or fabricated by a method described herein. Optionally, the display apparatus is a liquid crystal display apparatus. Optionally, the display apparatus is an organic light emitting diode display apparatus. Optionally, the display apparatus is an electrophoretic display apparatus. Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of operating a display apparatus having the display substrate described herein or fabricated by a method described herein. In some embodiments, the method includes actuating each of the plurality of color filter blocks thereby controlling a wavelength of light transmitted through each of the plurality of color filter blocks.

In some embodiments, the method includes applying an electrical signal to one of the plurality of electroactive blocks through the plurality of electrodes) thereby reversibly changes one or more characteristic body dimension of the one of the plurality of electroactive blocks, i.e., the one of the plurality of electroactive blocks exhibits a distortion upon receiving the applied electrical signal. As a result of this distortion, the one of the plurality of electroactive blocks may reversibly expand or retract in one or more dimension, and the expansion or retraction of the one of the plurality of electroactive blocks presses or pulls the corresponding one of the plurality of color filter blocks. The one of the plurality of color filter blocks is coupled to (e.g., in contact with) the corresponding one of the plurality of electroactive blocks so that the corresponding one of the plurality of electroactive blocks may exert a force to the one of the plurality of color filter blocks when it reversibly expands or retracts in one or more dimension. In some embodiments, the one of the plurality of electroactive blocks exerts a force to the corresponding one of the plurality of color filter blocks for changing the thickness of the corresponding one of the plurality of color filter blocks in response to the change in the strength of the electrical signal applied to the one of the plurality of electroactive blocks.

In some embodiments, the step of applying the electrical signal to one of the plurality of electroactive blocks includes generating an electrical field having a direction substantially parallel to the polarization direction of the one of the plurality of electroactive blocks. Optionally, the step includes applies a positive voltage and a negative voltage respectively to the two opposite sides of the one of the plurality of electroactive blocks, thereby forming an electrical field having a direction substantially parallel to a plane of the base substrate (horizontal direction). The inverse piezoelectric effect produced by the electrical field on the one of the plurality of electroactive blocks results in reflection of light of certain wavelength(s) by the corresponding one of the plurality of color filter blocks. The remaining light transmits through the corresponding one of the plurality of color filter blocks, achieving color filtering.

In some embodiments, the step of actuating each of the plurality of color filter blocks includes actuating each of the plurality of first color filter blocks so that light of a first color transmitted through each of the plurality of first color filter blocks, and actuating each of the plurality of second color filter blocks so that light of a second color transmitted through each of the plurality of second color filter blocks, the first color being, different from the second color. Optionally, the step of actuating each of the plurality of first color filter blocks includes applying an electrical signal to one of the plurality of first electroactive blocks thereby changing the thickness of the corresponding one of the plurality of first color filter blocks; and the step of actuating each of the plurality of second color filter blocks includes applying an electrical signal to one of the plurality of second electroactive blocks thereby changing the thickness of the corresponding one of the plurality of second color filter blocks.

In some embodiments, the step of actuating each of the plurality of color filter blocks includes actuating each of the plurality of first color filter blocks so that light of a first color transmitted through each of the plurality of first color filter blocks, actuating each of the plurality of second color filter blocks so that light of a second color transmitted through each of the plurality of second color filter blocks, and actuating each of the plurality of third color filter blocks so that light of a third color transmitted through each of the plurality of third color filter blocks, the first color, the second color, and the third color being three different colors (e.g., red, green, and blue). Optionally, the step of actuating each of the plurality of first color filter blocks includes applying an electrical signal to one of the plurality of first electroactive blocks thereby changing the thickness of the corresponding one of the plurality of first color filter blocks; the step of actuating each of the plurality of second color filter blocks includes applying an electrical signal to one of the plurality of second electroactive blocks thereby changing the thickness of the corresponding one of the plurality of second color filter blocks, and the step of actuating each of the plurality of third color filter blocks includes applying an electrical signal to one of the plurality of third electroactive blocks thereby changing the thickness of the corresponding one of the plurality of third color filter blocks.

In some embodiments, the step of actuating each of the plurality of color filter blocks further includes actuating each of the plurality of fourth color filter blocks so that light of a fourth color transmitted through each of the plurality of fourth color filter blocks, the fourth color being a color different from the first color, the second color, and the third color. Optionally, the fourth color is white.

In another aspect, the present disclosure provides a method of changing color display modes of a display apparatus having the display substrate described herein or fabricated by a method described herein. In some embodiments, the method includes changing color display modes of the display apparatus from a first color display mode to a second color display mode. In one example, the first color display mode is a RGB color display mode, and the second color display mode is a RGBW color display mode. In another example, the first color display mode is a RGBW color display mode, and the second color display mode is a RGB color display mode.

In the first color display mode (e.g., the RGB color display mode), the color filter includes N1 numbers of groups of color filter blocks, each group has a different color. In the second color display mode (e.g., the RGBW color display mode), the color filter includes N2 numbers of groups of color filter blocks, each group has a different color. In some embodiments, the method includes dividing the plurality of color filter blocks into N1 numbers of groups of color filter blocks in the first color display mode, and dividing the plurality of color filter blocks into N2 numbers of groups of color filter blocks in the second color display mode, N1 and N2 being two different positive integers. Optionally, the method further includes, in the first color display mode, actuating at least one group of the N1 groups of the color filter blocks so that light transmitted through each group of the N1 groups of the color filter blocks has different colors. Optionally, the method further includes, in the second color display mode, actuating at least one group of the N2 groups of the color filter blocks so that light transmitted through each group of the N2 groups of the color filter blocks has different colors.

In one example, the method includes, in the first color display mode, dividing the plurality of color filter blocks into a plurality of red color filter blocks, a plurality of green color filter blocks, and a plurality of blue color filter blocks; and, in the second color display mode, dividing the plurality of color filter blocks into a plurality of red color filter blocks, a plurality of green color filter blocks, a plurality of blue color filter blocks, and a plurality of white color filter blocks. Optionally, the the method further includes, in the first color display mode, actuating each of the plurality of red color filter blocks so that light of a red color transmitted through each of the plurality of red color filter blocks, actuating each of the plurality of green color filter blocks so that light of a green color transmitted through each of the plurality of green color filter blocks, and actuating each of the plurality of blue color filter blocks so that light of a blue color transmitted through each of the plurality of blue color filter blocks. Optionally, the the method further includes, in the second color display mode, actuating each of the plurality of red color filter blocks so that light of a red color transmitted through each of the plurality of red color filter blocks, actuating each of the plurality of green color filter blocks so that light of a green color transmitted through each of the plurality of ween color filter blocks, and actuating each of the plurality of blue color filter blocks so that light of a blue color transmitted through each of the plurality of blue color filter blocks. Optionally, the method further includes, in the second color display mode, actuating each of the plurality of white color filter blocks so that light of a white color transmitted through each of the plurality of white color filter blocks. Optionally, in the second color display mode, the plurality of white color filter blocks are left un-actuated.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified, by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate, comprising:
   a base substrate;
   a color filter on the base substrate and comprising a plurality of color filter blocks; and
   an actuator configured to actuate a respective color filter block of the plurality of color filter blocks thereby controlling a wavelength of light transmitted through the respective color filter block;

wherein the plurality of color filter blocks comprise at least a plurality of first color filter blocks and a plurality of second color filter blocks;

the actuator is configured to actuate a respective first color filter block of the plurality of first color filter blocks so that light of a first color transmitted through the respective first color filter block, and actuate a respective second color filter block of the plurality of second color filter blocks so that light of a second color transmitted through the respective second color filter block, the first color being different from the second color; and orthographic projections of the respective first color filter block and the respective second color filter block on the base substrate are non-overlapping with each other.

2. The display substrate of claim 1, wherein the actuator is configured to control a thickness of the respective color filter block thereby controlling the wavelength of light transmitted through the plurality of color filter blocks.

3. The display substrate of claim 1, wherein the respective color filter block comprises a liquid crystal elastomer.

4. The display substrate of claim 3, wherein the respective color filter block comprises a cross-linked polymer of a liquid crystal elastomer, a low molecular weight liquid crystal molecule, and a crosslinking monomer.

5. The display substrate of claim 4, wherein the cross-linking monomer is a photopolymerizable monomer.

6. The display substrate of claim 4, wherein the cross-linked polymer comprises approximately 10% w/w to approximately 70% w/w liquid crystal elastomer, approximately 4% w/w to approximately 86.99% w/w low molecular weight liquid crystal monomeric unit, and approximately 3% w/w to approximately 25% w/w crosslinker unit.

7. The display substrate of claim 4, wherein the liquid crystal elastomer is a siloxane liquid crystal elastomer.

8. The display substrate of claim 4, wherein the liquid crystal elastomer is a siloxane liquid crystal elastomer having a structure of formula I:

wherein $R_1$ is a liquid crystal monomeric unit, $R_2$ is a crosslinker unit, and $R_3$ is selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

9. The display substrate of claim 8, wherein $R_1$ is and
$R_2$ is

10. The display substrate of claim 4, wherein the low molecular weight liquid crystal molecule is selected from the group consisting of wherein * stands for a free radical.

11. The display substrate of claim 1, wherein the actuator is an electrical actuator comprising a plurality of electrodes for actuating the respective color filter block.

12. The display substrate of claim 11, wherein the actuator further comprises an electroactive layer;
- the electroactive layer comprises a plurality of electroactive blocks, a respective electroactive block of the plurality of electroactive blocks corresponding to one of the plurality of color filter blocks; and
- the respective electroactive block is configured to be actuated by one of the plurality of electroactive blocks so that the wavelength of light transmitted through the respective electroactive block changes in response to a change in an electrical signal applied to the one of the plurality of color filter blocks.

13. The display substrate of claim 12, wherein the respective electroactive block is configured to exert a force to one of the plurality of color filter blocks for changing a thickness of the one of the plurality of color filter blocks thereby controlling the wavelength of light transmitted through the respective color filter block.

14. The display substrate of claim 12, wherein
- the plurality of electroactive blocks comprises at least a plurality of first electroactive blocks and a plurality of second electroactive blocks;
- a respective first electroactive block of the plurality of first electroactive blocks is configured to actuate the respective first color filter block so that light of a first color transmitted through the respective first color filter block; and
- a respective second electroactive block of the plurality of second electroactive blocks is configured to actuate the respective second color filter block so that light of a second color transmitted through the respective second color filter block.

15. The display substrate of claim 12, wherein a projection of the respective color filter block on the base substrate at least partially overlaps with a projection of one of the plurality of electroactive blocks on the base substrate.

16. The display substrate of claim 15, further comprising a black matrix in an inter-subpixel region of the display substrate;
- wherein a projection of the black matrix on the base substrate covers a projection of the plurality of electrodes on the base substrate.

17. A display apparatus, comprising the display substrate of claim 1.

18. A method of operating a display apparatus comprising the display substrate of any one of claim 1; the method comprising actuating the respective color filter block thereby controlling a wavelength of light transmitted through the respective color filter block.

19. The method of claim 18, further comprising:
- dividing the plurality of color filter blocks into N1 numbers of groups of color filter blocks in a first color display mode;
- dividing the plurality of color filter blocks into N2 numbers of groups of color filter blocks in a second color display mode, N1 and N2 being two different positive integers;
- actuating at least one group of the N1 groups of the color filter blocks in the first color display mode so that light transmitted through each group of the N1 groups of the color filter blocks has different colors; and
- actuating at least one group of the N2 groups of the color filter blocks in the second color display mode so that light transmitted through each group of the N2 groups of the color filter blocks has different colors.

* * * * *